United States Patent
Starling et al.

(10) Patent No.: US 7,593,518 B2
(45) Date of Patent: Sep. 22, 2009

(54) METHODS, SYSTEMS, AND COMPUTER PROGRAM PRODUCTS FOR PROCESSING A CALLING PARTY NUMBER TO ACTIVATE A FUNCTION AND/OR CONVEY INFORMATION AT A TERMINATING DEVICE

(75) Inventors: Gerald Starling, Hampton, GA (US); Robert Dewey Smith, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 771 days.

(21) Appl. No.: 11/290,751

(22) Filed: Nov. 30, 2005

(65) Prior Publication Data

US 2007/0123279 A1    May 31, 2007

(51) Int. Cl.
*H04M 1/56* (2006.01)

(52) U.S. Cl. .............................. 379/142.04; 379/207.15

(58) Field of Classification Search .................. 379/350, 379/102.01, 142.04, 207.15
See application file for complete search history.

(56) References Cited

U.S. PATENT DOCUMENTS

2006/0056399 A1*   3/2006   Christie et al. .............. 370/352

* cited by examiner

*Primary Examiner*—Creighton Smith
(74) *Attorney, Agent, or Firm*—Myers Bigel Sibley & Sajovec, P.A.

(57) ABSTRACT

A network processes a call that has a calling party number field in a signaling message that is associated therewith. The calling party number field includes a calling party number and command codes that are used to activate a function at a terminating device and/or convey information.

12 Claims, 5 Drawing Sheets

FIG. 5

US 7,593,518 B2

METHODS, SYSTEMS, AND COMPUTER PROGRAM PRODUCTS FOR PROCESSING A CALLING PARTY NUMBER TO ACTIVATE A FUNCTION AND/OR CONVEY INFORMATION AT A TERMINATING DEVICE

FIELD OF THE INVENTION

The present invention relates to communication networks, and, more particularly, to communication networks that use common channel signaling, such as Signaling System 7 (SS7).

BACKGROUND OF THE INVENTION

A voice and/or data call on a communication network may be viewed as comprising two components: 1) the actual content, e.g., voice or data information being communicated, and 2) the information transmitted that is used by the communication network in establishing connections and routing the content to the appropriate destination. Historically, connections in the public switched telephone network (PSTN) were established and managed using "in band" signaling techniques. In band signaling involves transmitting on the same medium that carries the content of the connection. Unfortunately, in band signaling can be inefficient in that network resources are reserved from the point a call is originated to the destination point of the call even if the called party is unable to answer the call.

Another type of signaling in which the signaling information is carried separately from the bearer channels used to carry the content of the connection is known as Common Channel Signaling (CCS). A CCS system may operate as a single resource that is dedicated to signaling and can be used to manage numerous connections in the PSTN, for example, that carry content. One example of a CCS protocol is Signaling System 7 (SS7), which is a set of protocols that describe a framework by which information is exchanged between systems in a network via dedicated signaling channels. Advantageously, CCS systems in general, and SS7 systems in particular, are substantially independent of the underlying switching and transmission technology. As a result, SS7 systems can evolve without being dependent on the evolution of the switching and/or transmission equipment that is used to carry content in the network.

SUMMARY OF THE INVENTION

According to some embodiments of the present invention, a communication method involves processing a call that has a calling party number field in a signaling message that is associated therewith. The calling party number field includes a calling party number and command codes that are used to activate a function at a terminating device and/or convey information.

In other embodiments, the function comprises using a vibrate ring mode for the terminating device.

In still other embodiments, the function comprises using a ring tone identified by the command codes at the terminating device.

In still other embodiments, the function comprises using a ring tone identified by the command codes and a vibrate ring mode together at the terminating device.

In still other embodiments, the call is originated at a controller and the conveyed information comprises information associated with a unit in communication with the controller.

In still other embodiments, the conveyed information comprises an indication that a smoke/fire alarm has been activated, an indication that a doorbell has been rung, an indication that an alarm system has been set off, and/or a temperature reading.

In still other embodiments, the conveyed information further comprises geographical location information.

In still other embodiments, the terminating device is a controller and the function comprises controlling operation of a unit in communication with the controller.

In still other embodiments, the unit comprises an audio and/or video recorder, a light, a thermostat, an appliance, and/or an alarm.

In still other embodiments, the signaling message is a Signaling System 7 Initial Address Message.

Although described primarily above with respect to method aspects of the present invention, it will be understood that the present invention may also be embodied as systems and computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

For purposes of illustration, embodiments of the present invention are described herein with respect to use of a Signaling System 7 (SS7) network to process a nature of address indicator and/or a calling party number to support various features for both a network service provider and/or an end user. It will be understood, however, that embodiments of the present invention are not limited to SS7 networks or any particular Common Channel Signaling (CCS) network, but instead may be embodied generally as any network architecture capable of carrying out the operations described herein.

Figure 1:
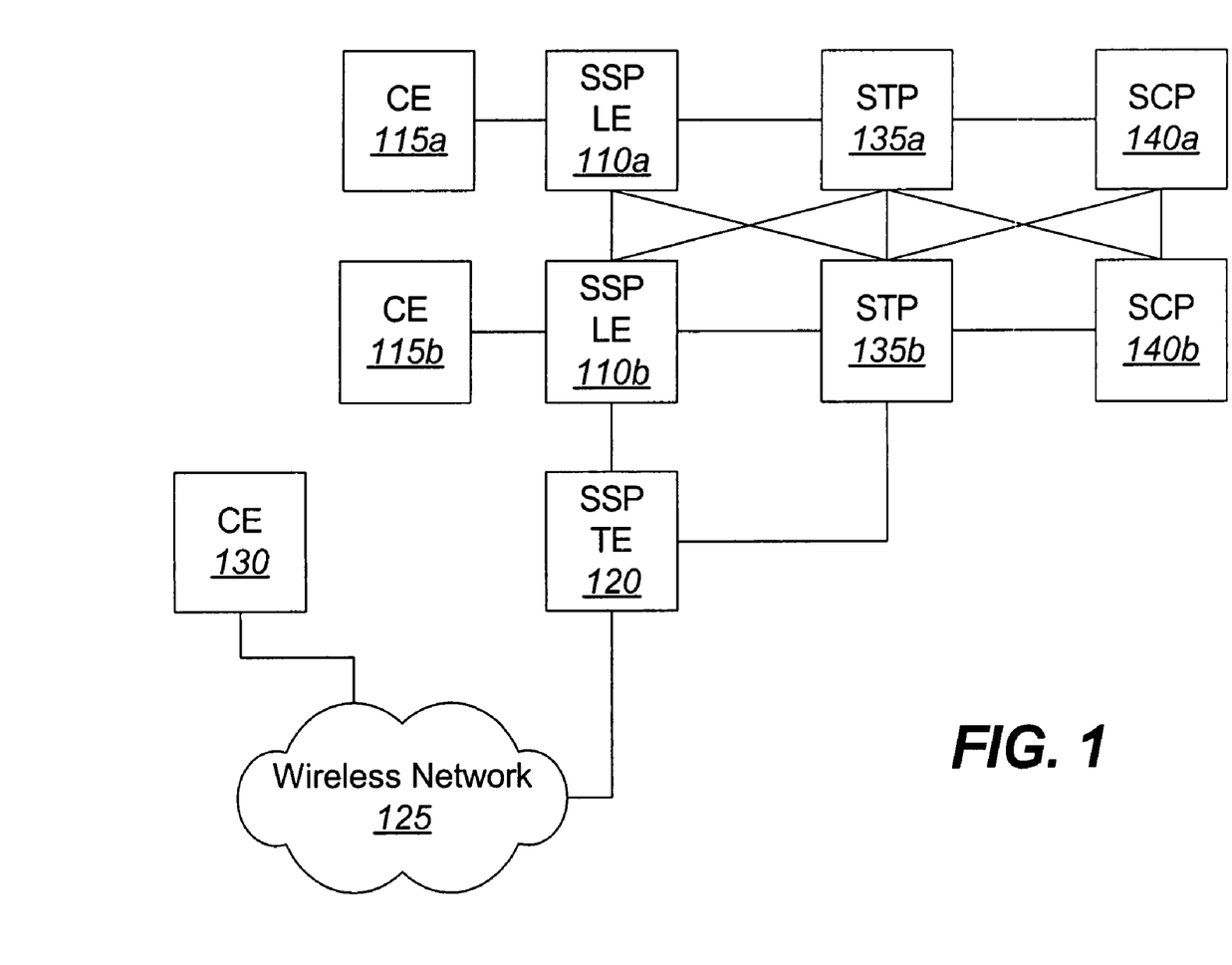
FIG. 1 is a block diagram that illustrates a communication network in accordance with some embodiments of the present invention.

Referring now to FIG. 1, an exemplary SS7 network architecture 100 for processing a calling party number to activate a function and/or convey information at a terminating device, in accordance with some embodiments of the present invention, comprises Service Switching Points (SSPs) 110a and 110b that terminate customer equipment (CE) 115a and 115b, respectively. It will be understood that CE 115a and 115b may represent one or more devices that may be used to originate and or terminate a call over a communication network, such as the public switched telephone network (PSTN). The SS7 network 100 further comprises an SSP 120 that is connected to a wireless network 125 by, for example, trunk lines/channels. The wireless network terminates CE 130, which may represent one or more mobile terminals. As used herein, the term "mobile terminal or device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

SSPs 110a and 110b are switches that originate, terminate, and route calls and provide entry into the SS7 network. SSPs 110a and 110b may be called "local exchange" switches because they terminate connections to end-users and, as shown in FIG. 1, optionally include trunk connection(s) between each other. SSP 120 may be called a "tandem exchange" because it does not terminate connections to end users, but instead terminates only trunks to other SSPs (e.g., SSP 110b) or the wireless network 125, for example. SSPs 110*a* and 110*b* may be referred to as Class 5 switching systems while SSP 120 may be referred to as a Class 4 switching system.

In an SS7 network, SSPs send signaling messages to other SSPs to setup, manage, and release network resources to complete calls/connections. The signaling traffic between SSPs is carried by one or more Signal Transfer Points (STPs). As shown in FIG. 1, STPs 135*a* and 135*b* may be used to send SS7 signaling messages between SSPs 110*a* and 110*b* and/or to other SSPs not shown in FIG. 1. An STP is typically embodied as a packet switch that routes each incoming message to an outgoing signaling link based on routing information contained in the SS7 message.

The SS7 network 100 further comprises Signal Control Points (SCPs) 140*a* and 140*b*, which may optionally be used to provide Intelligent Network (IN) services by allowing the SSPs in the SS7 network to access the SCPs via special signaling messages.

Although FIG. 1 illustrates an exemplary communication network, it will be understood that the present invention is not limited to such configurations, but is intended to encompass any configuration capable of carrying out the operations described herein.

Figure 2:
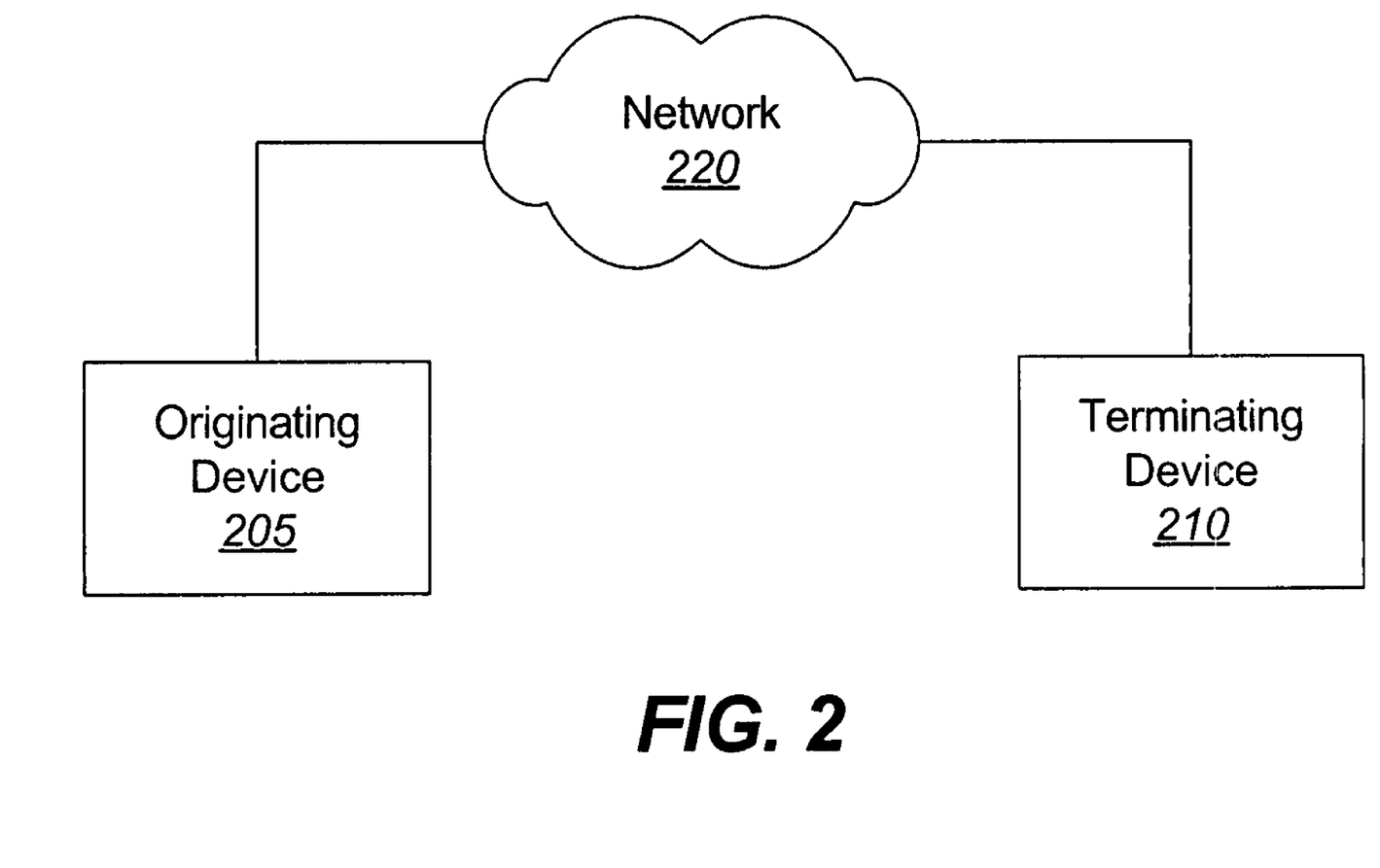
FIGS. 2 and 3 are block diagrams that illustrate communication networks in accordance with further embodiments of the present invention.

FIG. 2 illustrates an exemplary network 200 for processing a calling party number to activate a function and/or convey information at a terminating device in accordance with further embodiments of the present invention. As shown in FIG. 2, the network 200 comprises an originating device 205 and a terminating device 210 that are connected by a network 220. The originating and terminating devices 205, 210 may be embodied as CE devices 115*a*, 115*b*, and/or 130 of FIG. 1 in accordance with some embodiments of the present invention. The network 220 may represent a global network, such as the Internet, cable television network, Public Switched Telephone Network (PSTN), or other publicly accessible network. In some embodiments, the network 220 may comprise a SS7 network, such as the SS7 network of FIG. 1. The network 220 may also, however, represent a wide area network, a local area network, an Intranet, or other private network, which may not be accessible by the general public. Furthermore, the network 220 may represent a combination of public and private networks or a virtual private network (VPN). As discussed in greater detail below, the originating device 205 may be configured to provide additional command codes for a calling party number field, such as a SS7 calling party number field, that may be processed at the terminating device 210 to activate a function or convey information.

Figure 3:
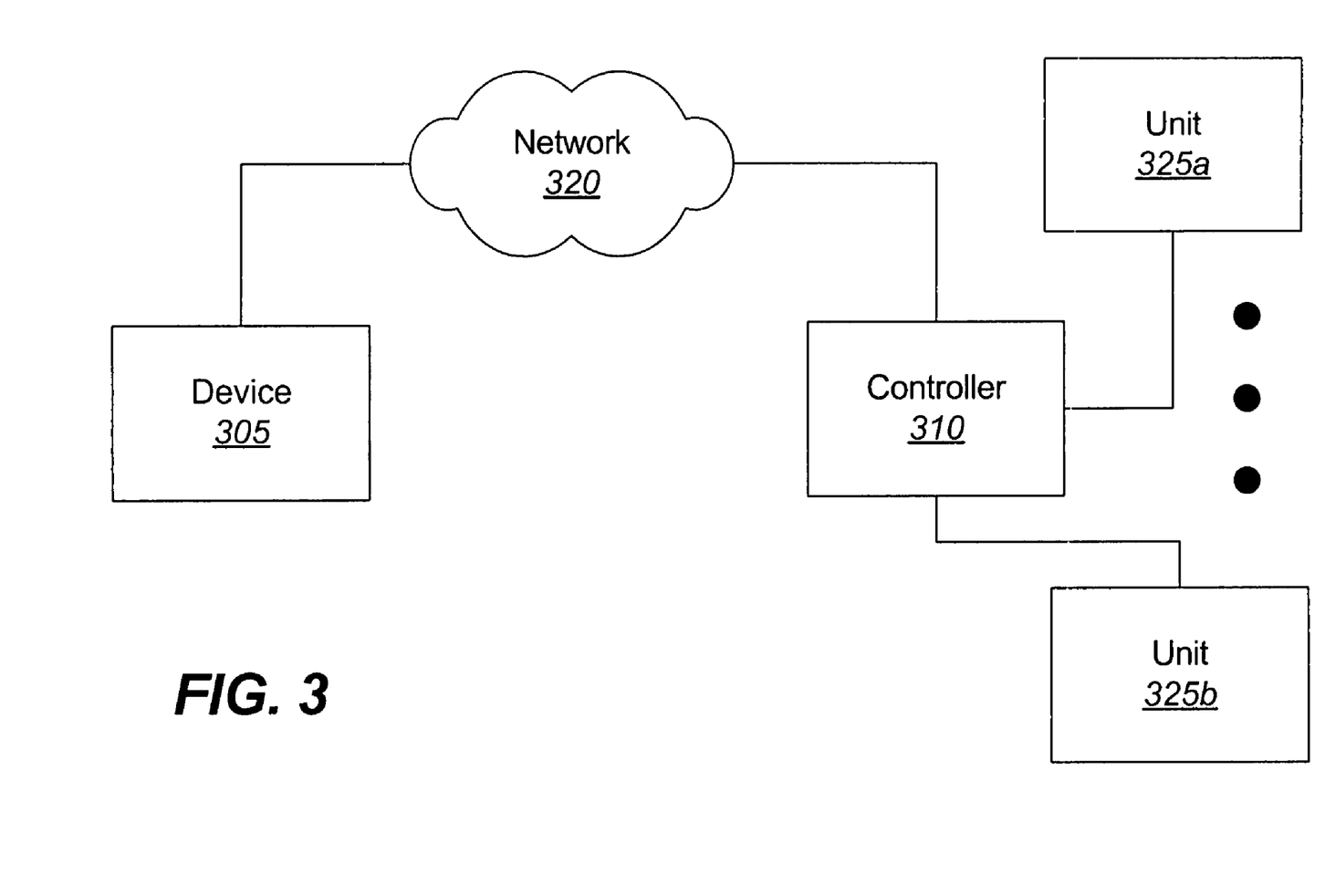

FIG. 3 illustrates an exemplary network 300 for processing a calling party number to activate a function and/or convey information at a terminating device in accordance with further embodiments of the present invention. As shown in FIG. 3, the network 300 comprises a device 305 and a controller 310 that are connected by a network 320. The device 305 may be embodied as CE device 115*a*, 115*b*, and/or 130 of FIG. 1 in accordance with some embodiments of the present invention. The controller 310 may be a device that is configured to communicate with and/or control the operation of other devices, such as units 325*a* and 325*b*. For example, the controller 310 may be installed in a home and configured to control the operation of units, such as, but not limited to, lights, a thermostat, an alarm system, one or more appliances, an audio and/or video recorder, and/or a doorbell. Moreover, the controller 310 may be configured to originate and receive calls over the network 320. The network 320 may be embodied as the network 220 of FIG. 2. As discussed in greater detail below, the device 305 and the controller 310 may be configured to provide additional command codes for a calling party number field, such as a SS7 calling party number field that may be processed at a terminating device to activate a function or convey information. In accordance with various embodiments of the present invention, the device 305 and the controller 310 may be originating devices, terminating devices, or both originating and terminating devices.

Although FIGS. 2 and 3 illustrate an exemplary communication network, it will be understood that the present invention is not limited to such configurations, but is intended to encompass any configuration capable of carrying out the operations described herein.

Figure 4:
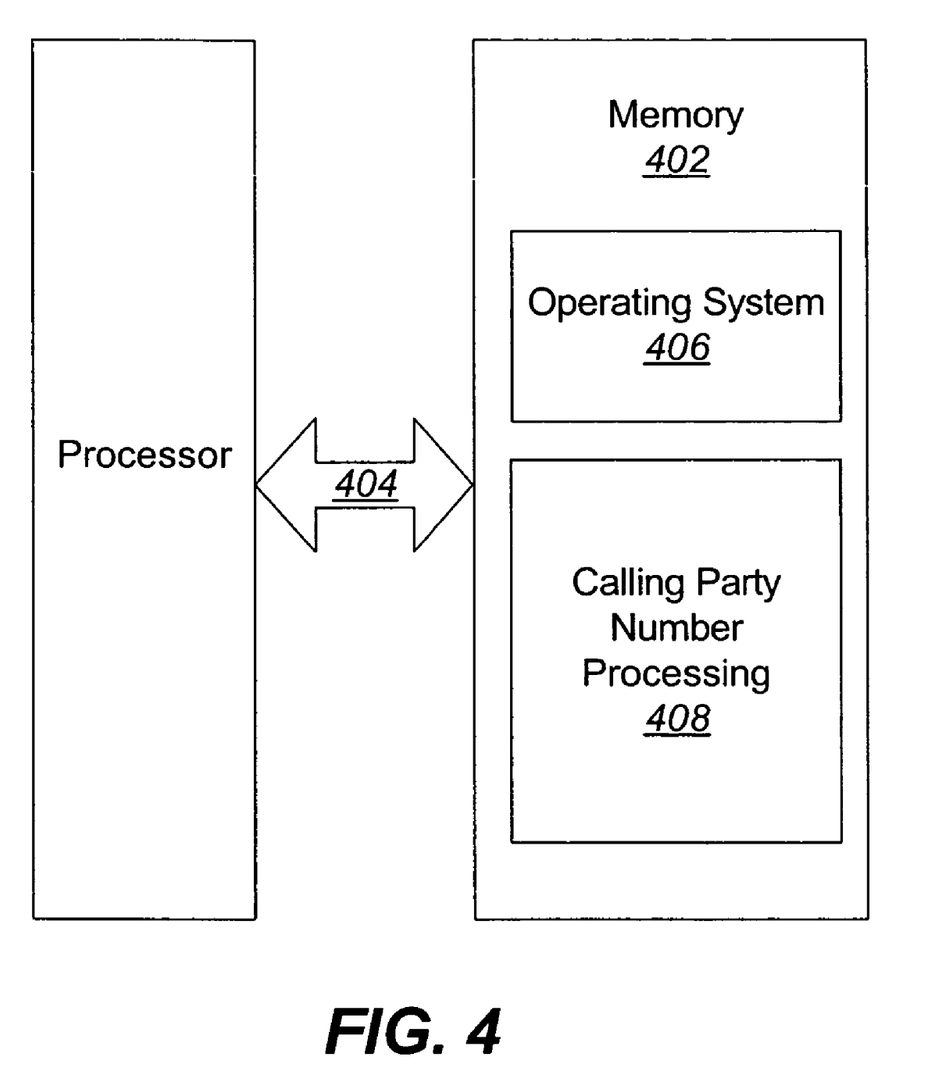
FIG. 4 is a block diagram that illustrates a software architecture for processing a calling party number to activate a function and/or convey information at a terminating device in accordance with some embodiments of the present invention.

FIG. 4 illustrates a processor 400 and a memory 402 that may be used in embodiments of methods, systems, and computer program products for processing a calling party number to activate a function and/or convey information at a terminating device. For example, in some embodiments of the present invention, the processor 400 and memory 402 may be used to embody the processors and the memories used in the originating and terminating devices 205 and 210 of FIG. 2 and/or the device 305 and controller 310 of FIG. 3. The processor 400 communicates with the memory 402 via an address/data bus 404. The processor 400 may be, for example, a commercially available or custom microprocessor. The memory 402 is representative of the overall hierarchy of memory devices containing the software and data used to process a calling party number to activate a function and/or convey information at a terminating device, in accordance with some embodiments of the present invention. The memory 402 may include, but is not limited to, the following types of devices: cache, ROM, PROM, EPROM, EEPROM, flash, SRAM, and DRAM.

As shown in FIG. 4, the memory 402 may hold two or more major categories of software and data: an operating system 406 and a calling party number processing module 408. The operating system 406 controls the operation of the device or controller. In particular, the operating system 406 may manage the device's or controller's resources and may coordinate execution of programs by the processor 400. The calling party number processing module 408 may comprise logic for providing additional command codes for the calling party number field, such as the SS7 calling party number field, at an originating device and may comprise logic to process the additional command codes at a terminating device to activate a function or convey information.

The calling party number processing module 408 may cooperate with the SS7 protocol to provide information to populate and/or process an Initial Address Message (IAM). The IAM is a message that is used as part of the SS7 ISDN User Part (ISUP) layer. The ISUP layer corresponds generally to parts of the transport through application layers in the Open Systems Interconnect (OSI) seven-layer model. ISUP defines the protocol and procedures used to set-up, manage, and release network resources that carry calls over a communication network, such as the PSTN. ISUP is used for both ISDN and non-ISDN calls. An IAM message is forwarded from the originating SSP to the terminating SSP via the STPs in the SS7 network. The IAM contains the called party number in the mandatory variable part of the message and contains the calling party number in the optional variable part of the message.

Although FIG. 4 illustrates an exemplary software architecture that may facilitate providing additional command codes for the calling party number field at an originating device, and processing the additional command codes at a terminating device to activate a function or convey information, it will be understood that the present invention is not limited to such a configuration but is intended to encompass any configuration capable of carrying out the operations described herein.

Computer program code for carrying out operations of devices and/or controllers discussed above with respect to FIG. 4 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary operations for processing a calling party number to activate a function and/or convey information at a terminating device, in accordance with some embodiments of the present invention, will now be described with reference to FIG. 5. Operations begin at block 500 where an originating device, such as the originating device 205 of FIG. 2, device 305 of FIG. 3, and/or the controller 310 of FIG. 3, originates a call in which a calling party number field, such as a calling party number field in an SS7 IAM message, is populated with both a calling party number and command codes. A network, such as networks 220 and 320 of FIGS. 2 and 3, respectively, process the call. As discussed above, networks 220 and 320 may each comprise a SS7 network as shown in FIG. 1. At block 505, the call completes at a terminating device, such as the terminating device 210 of FIG. 2, device 305 of FIG. 3, and/or the controller 310 of FIG. 3, where the command codes are processed to activate a function or convey information at the terminating device.

Some embodiments of the present invention may be illustrated by way example. An originating device may populate the calling party number field using a selection from a plurality of combinations of command codes. The first ten digits of the calling party number field may be populated with a ten-digit phone number. Four additional digits may be used for command codes to activate a function at the terminating device or convey information at the terminating device. For example, the following command codes may be used in accordance with some embodiments of the present invention:

Command code 0055 Function—use vibrate mode on terminating device
Command code 0088 Function—use special ring tone #8
Command code 0087 Function—use special ring tone #7
Command code 0099 Function—use vibrate mode and special ring tone #9
Command code 3456 Information—fire/smoke alarm has activated
Command code 6789 Information—door bell has been rung
Command code 1234 Information—temperature in living room As illustrated by the foregoing example, command codes may be used to activate various functions, such as, but not limited to, ring modes and ring tones used at a terminating device. In addition, various types of information may be communicated through the command codes. For example, the controller 310 of FIG. 3 may communicate with various units 325a, 325b to collect information such as, but not limited to, an indication that a smoke/fire alarm has been activated, an indication that a door bell has been rung, an indication that an alarm system has been set off, and/or a temperature reading. In some embodiments, the controller 310 may make a call to a terminating device to notify a homeowner, for example, that someone has rang the doorbell at his/her house. The homeowner may then speak to the person at the door remotely through the controller 310 and a speaker unit. In some embodiments, the controller 310 or other originating device may use a command code to convey geographical location information. In the case of the controller 310, for example, such geographical location information may be beneficial to a police or fire department if an alarm was set off to assist the authorities in identifying the location of an intrusion or where a fire has started.

In other embodiments, the controller 310 may operate as a terminating device to allow a user to operate the units 325a, 325b remotely. For example, a user may originate a call using device 305 of FIG. 3 and may include a command code to operate one or more units 325a, 325b. These units may include, but are not limited to, an audio and/or video recorder, a light, a thermostat, an appliance, and/or an alarm. Advantageously, a user may make a call to a controller 310 in his/her home with a command code to turn on the heat/air conditioning before he/she reaches home, with a command code to turn on the inside and/or outside lights, with a command code to turn on an appliance, such as an oven, and/or with a command code to activate/deactivate a home alarm/security system.

Figure 5:
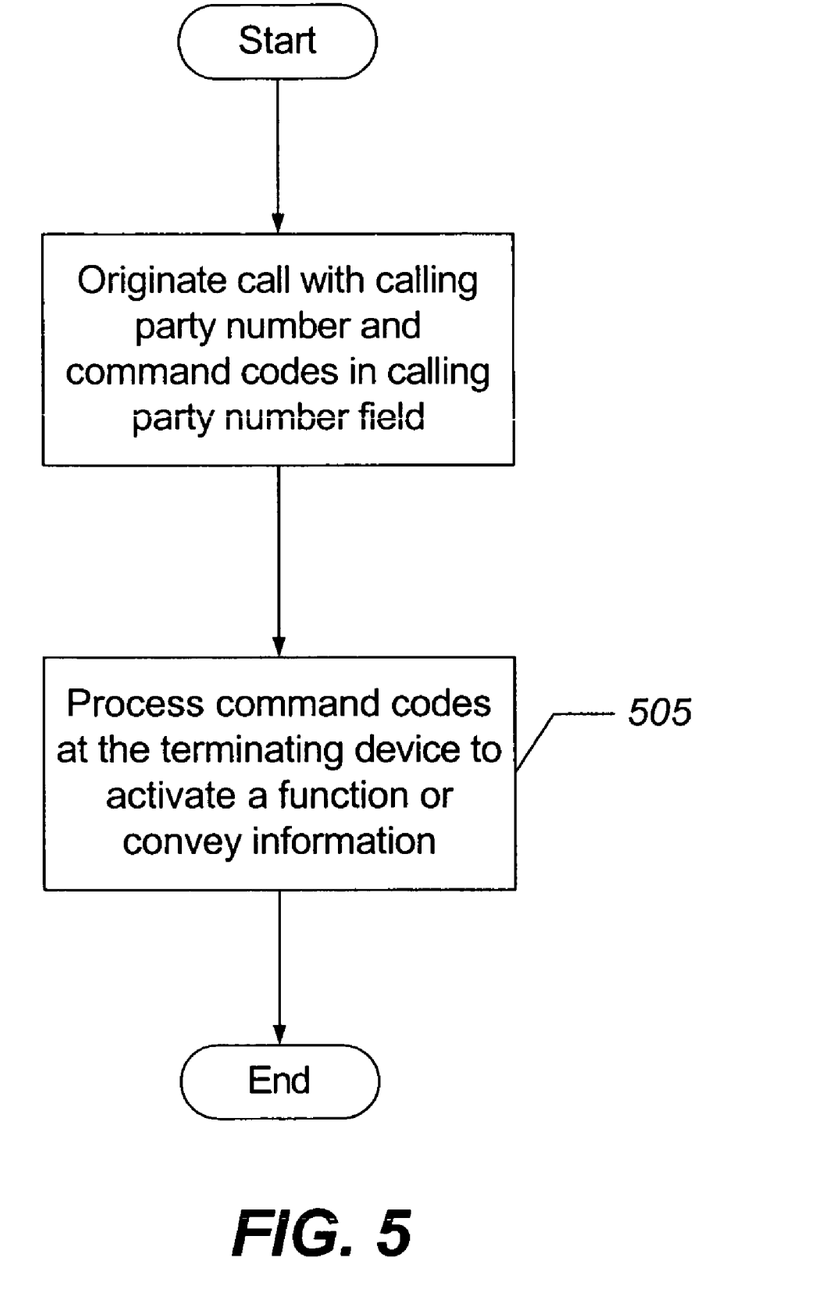
FIG. 5 is a flowchart that illustrates operations for processing a calling party number to activate a function and/or convey information at a terminating device in accordance with some embodiments of the present invention.

The flowchart of FIG. 5 illustrates the architecture, functionality, and operations of some embodiments of methods, systems, and computer program products for processing a calling party number to activate a function and/or convey information at a terminating device. In this regard, each block in the table represents a module, segment, or portion of code, which comprises one or more executable instructions for implementing the specified logical function(s). It should also be noted that in other implementations, the function(s) noted in the blocks may occur out of the order described with respect to FIG. 3.

Many variations and modifications can be made to the preferred embodiments without substantially departing from the principles of the present invention. All such variations and modifications are intended to be included herein within the scope of the present invention, as set forth in the following claims.

That which is claimed:

1. A communication method, comprising:
   processing a call that has a calling party number field in a signaling message that is associated therewith, the calling party number field comprising a calling party number and command codes that are used to activate a function at a terminating device and/or convey information;
   wherein the function comprises at least one of the following:
   using a vibrate ring mode for the terminating device; and
   using a ring tone identified by the command codes at the terminating device.

2. The communication method of claim 1, wherein the signaling message is a Signaling System 7 Initial Address Message.

3. A computer program product, comprising:
   a computer readable storage medium having computer readable program code embodied therein, the computer readable program code being configured to carry out the method of claim 1.

4. A communication method, comprising:
   processing a call that has a calling party number field in a signaling message that is associated therewith, the calling party number field comprising a calling party number and command codes that are used to activate a function at a terminating device and/or convey information;

wherein processing a call comprises processing a call that is originated at a controller;

wherein the conveyed information comprises information associated with a unit in communication with the controller; and wherein the conveyed information comprises an indication that a smoke/fire alarm has been activated, an indication that a door bell has been rung, an indication that an alarm system has been set off, and/or a temperature reading.

5. The communication method of claim 4, wherein the conveyed information further comprises geographical location information.

6. A communication method, comprising:

processing a call that has a calling party number field in a signaling message that is associated therewith, the calling party number held comprising a calling party number and command codes that are used to activate a function at a terminating device and/or convey information;

wherein the terminating device is a controller and wherein the function comprises controlling operation of a unit in communication with the controller.

7. The communication method of claim 6, wherein the unit comprises an audio and/or video recorder, a light, a thermostat, an appliance, and/or an alarm.

8. A communication system, comprising:

a network that is configured to process a call that has a calling party number field in a signaling message that is associated therewith, the calling party number field comprising a calling party number and command codes that are used to activate a function at a terminating device and/or convey information;

wherein the function comprises at least one of the following:

using a vibrate ring mode for the terminating device; and using a ring tone identified by the command codes at the terminating device.

9. A communication system, comprising:

a network that is configured to process a call that has a calling party number field in a signaling message that is associated therewith, the calling party number field comprising a calling party number and command codes that are used to activate a function at a terminating device and/or convey information;

wherein the call is originated by a controller and wherein the conveyed information comprises information associated with a unit in communication with the controller; and wherein the conveyed information comprises an indication that a smoke/fire alarm has been activated, an indication that a door bell has been rung, an indication that an alarm system has been set off, and/or a temperature reading.

10. The system of claim 9, wherein the conveyed information further comprises geographical location information.

11. A communication system, comprising:

a network that is configured to process a call that has a calling party number field in a signaling message that is associated therewith, the calling party number field comprising a calling party number and command codes that are used to activate a function at a terminating device and/or convey information;

wherein the terminating device is a controller and wherein the function comprises controlling operation of a unit in communication with the controller.

12. The system of claim 11, wherein the unit comprises an audio and/or video recorder, a light, a thermostat, an appliance, and/or an alarm.

* * * * *

UNITED STATES PATENT AND TRADEMARK OFFICE
CERTIFICATE OF CORRECTION

PATENT NO. : 7,593,518 B2
APPLICATION NO. : 11/290751
DATED : September 22, 2009
INVENTOR(S) : Starling et al.

It is certified that error appears in the above-identified patent and that said Letters Patent is hereby corrected as shown below:

In the Claims
Column 9, Line 18, Claim 6: Please correct "number held"
to read -- number field --

Signed and Sealed this

First Day of December, 2009

David J. Kappos
*Director of the United States Patent and Trademark Office*